(12) United States Patent
Colignon

(10) Patent No.: US 7,824,481 B2
(45) Date of Patent: Nov. 2, 2010

(54) SYSTEM FOR EVALUATING THE CHARGE STATE OF AN EXHAUST LINE DEPOLLUTION MEANS

(75) Inventor: Christophe Colignon, Levallois Perret (FR)

(73) Assignee: Peugeot Citroen Automobiles SA, Velizy Villacoublay (FR)

( * ) Notice: Subject to any disclaimer, the term of this patent is extended or adjusted under 35 U.S.C. 154(b) by 863 days.

(21) Appl. No.: 11/571,260

(22) PCT Filed: Jun. 22, 2005

(86) PCT No.: PCT/FR2005/050477

§ 371 (c)(1),
(2), (4) Date: Dec. 22, 2006

(87) PCT Pub. No.: WO2006/005875

PCT Pub. Date: Jan. 19, 2006

(65) Prior Publication Data

US 2007/0157818 A1 Jul. 12, 2007

(30) Foreign Application Priority Data

Jun. 23, 2004 (FR) .................................. 04 06865

(51) Int. Cl.
| | |
|---|---|
| *B01D 49/00* | (2006.01) |
| *B01D 39/00* | (2006.01) |
| *B01D 39/06* | (2006.01) |
| *B01D 39/14* | (2006.01) |
| *B01D 50/00* | (2006.01) |
| *F01N 3/10* | (2006.01) |
| *F01N 3/08* | (2006.01) |
| *F01N 3/00* | (2006.01) |
| *B01J 23/00* | (2006.01) |

(52) U.S. Cl. .............................. 96/417; 55/522; 55/523; 55/524; 422/172; 422/173; 422/174; 422/175; 422/176; 422/177; 422/178; 422/179; 422/180; 502/303; 60/297

(58) Field of Classification Search ........... 55/522–524; 502/303; 60/297; 422/172–180; 96/417
See application file for complete search history.

(56) References Cited

U.S. PATENT DOCUMENTS 4,416,676 A * 11/1983 Montierth .................... 55/523

(Continued)

FOREIGN PATENT DOCUMENTS

DE 19906287 A1 8/2000

(Continued)

OTHER PUBLICATIONS

Bunting, A, "Springing the trap", Automotive Engineer, Mechanical Engineering Publ. Ltd. Bury St. Edmunds, GB, vol. 25, No. 5, May 2000, pp. 73-74.

(Continued)

*Primary Examiner*—Walter D Griffin
*Assistant Examiner*—Amber Orlando
(74) *Attorney, Agent, or Firm*—Nicolas E. Seckel

(57) ABSTRACT

The inventive system for evaluating the charged state of depollution means integrated into the exhaust line of a motor vehicle engine is characterised in that it comprises means (7) for determining a pressure in the depollution means, means (8) for determining the volume gas flowrate upstream said depollution means (10) and means for comparing the depollution means state defined by the thus determined pressure and the volume flowrate with a predetermined diagram (11) of the absent, overcharged and clogged states of the depollution means in order to evaluate the state thereof.

6 Claims, 3 Drawing Sheets

U.S. PATENT DOCUMENTS

| | | | |
|---|---|---|---|
| 4,512,786 A * | 4/1985 | Sakurai et al. | 55/282 |
| 5,171,335 A * | 12/1992 | Kojima et al. | 55/523 |
| 5,243,819 A * | 9/1993 | Woerner et al. | 60/274 |
| 5,511,413 A | 4/1996 | Pfister et al. | |
| 5,655,366 A * | 8/1997 | Kawamura | 60/286 |
| 5,677,258 A * | 10/1997 | Kurokawa et al. | 502/303 |
| 5,758,496 A * | 6/1998 | Rao et al. | 60/295 |
| 6,126,572 A * | 10/2000 | Smith | 482/4 |
| 6,206,944 B1 * | 3/2001 | Hickman | 55/523 |
| 6,829,889 B2 * | 12/2004 | Saito et al. | 60/291 |
| 7,052,532 B1 * | 5/2006 | Liu et al. | 96/154 |
| 7,152,397 B2 * | 12/2006 | Colignon | 60/295 |
| 7,320,214 B2 * | 1/2008 | Kanazawa et al. | 60/286 |
| 2002/0194843 A1 * | 12/2002 | Ootake | 60/297 |
| 2003/0230077 A1 | 12/2003 | Kuboshima et al. | |
| 2004/0040290 A1 * | 3/2004 | Crawley et al. | 60/295 |
| 2004/0206061 A1 * | 10/2004 | Ichikawa | 55/523 |
| 2005/0000211 A1 * | 1/2005 | Fayard | 60/295 |
| 2005/0002796 A1 * | 1/2005 | Knoblauch et al. | 417/53 |

FOREIGN PATENT DOCUMENTS

| | | |
|---|---|---|
| FR | 2781251 A1 | 1/2000 |
| FR | 2836956 A1 | 9/2003 |

OTHER PUBLICATIONS

"Diesel fuel regeneration", Dieselnet Technology Guide, Jul. 2001.

* cited by examiner

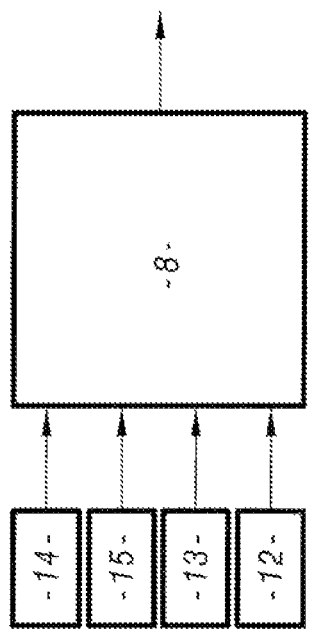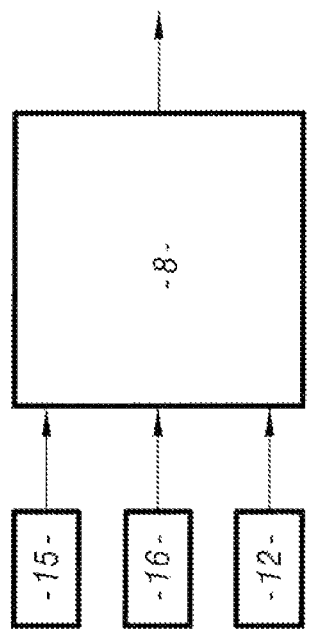

SYSTEM FOR EVALUATING THE CHARGE STATE OF AN EXHAUST LINE DEPOLLUTION MEANS

The present invention concerns a system for evaluating the loading state of depollution means.

More particularly, the invention concerns such a system in which the depollution means are integrated in an exhaust line of a motor vehicle engine.

Such an engine can be associated with common rail means for the supply of fuel to the cylinders thereof, according to at least one post-injection.

Such a post-injection is, in a standard manner, an injection of fuel after the high dead center of the cylinder under consideration.

These supply means are adapted to implement, in isocouple, through modification of parameters for controlling the operation of the engine, different regeneration strategies that make is possible to obtain different thermal levels in the exhaust line.

Thus, for example, supply means implementing regeneration strategies called normal, level 1, level 2, and/or over-calibrated level 2 strategies, have already been proposed.

Indeed, it is known that, to ensure the regeneration of depollution means such as a particle filter, the soot trapped therein are burned thanks to the thermal energy provided by the engine and to the exotherm performed by the combustion of the HC and of the CO on means forming oxidation catalyst, placed, for example, upstream of the particle filter.

This combustion can be assisted by a catalyzing element mixed with the soot, coming, for example, from a regeneration assistance additive, mixed with the fuel for the supply of the engine, or by a catalyst deposited directly on the walls of the particle filter (catalyzed particle filter).

The higher the thermal levels in the exhaust line at the inlet of the particle filter, the shorter the duration of the filter regeneration.

However, the loading state of the depollution means must be evaluated in the most reliable possible manner, because of issues of operation security thereof and of the engine, and to optimize the triggering of the regeneration.

The object of the invention is thus to propose such a system.

To this effect, an object of the invention is a system for evaluating the loading state of depollution means integrated in an exhaust line of a motor vehicle diesel engine, characterized in that it comprises means for determining a pressure in the area of the depollution means, means for determining a volume flow rate of the gases upstream of these depollution means, and means for comparing the state point of the depollution means, defined by the pressure and the volume flow rate thus determined, to a predetermined abacus of absent, over-loaded, and plugged states of the depollution means, to evaluate the state thereof.

According to other characteristics of the invention:

the pressure is a differential pressure at the boundaries of the depollution means and the volume flow rate upstream of the depollution means is determined according to the following equation:

$$Q_{vol}=(R*(AT2+273.15)/(\Delta P+Patmo)*\text{Air mass flow rate})$$

in which $Q_{vol}$ represents the volume flow rate, R is a constant, AT2 is the temperature of the boundaries upstream of the depollution means, $\Delta P$ is the differential pressure at the boundaries of these depollution means, provided by a differential pressure sensor, Patmo is the atmospheric pressure and air mass flow rate is the flow rate of the gases flowing through the depollution means;

the pressure is an absolute pressure upstream of the depollution means and the volume flow rate upstream of the depollution means is determined according to the following equation:

$$Q_{vol}=(R*(AT2+273.15)/P4*\text{Air mass flow rate})$$

in which $Q_{vol}$ represents the volume flow rate, R is a constant, AT2 represents the temperature of the gases upstream of the depollution means, P4 is the absolute pressure of the gases provided by an absolute pressure sensor at the inlet of the depollution means, and air mass flow rate is the flow rate of the gases flowing through the depollution means;

the states of the depollution means are defined by absent state, over-loaded state, and plugged state curves, among which the absent state curve of the depollution means is multiplied by an altimetric correction coefficient as a function of the atmospheric pressure;

the comparison means comprise means for comparing the determined volume flow rate to a low volume flow rate threshold value, to authorize the determination of the state of the depollution means only if the determined volume flow rate is higher than the low threshold value;

the comparison means comprise means for validating the state if this state is maintained over a time period longer than a predetermined confirmation time period;

the depollution means comprise a particle filter;

the particle filter is catalyzed;

the depollution means comprise a NOx trap;

the fuel comprises an additive intended to be deposited, with the particles with which it is mixed, on the depollution means to facilitate its regeneration;

the depollution means are impregnated with a Selective Catalytic Reduction formulation, ensuring a CO/HC oxidation function;

the fuel comprises an additive forming NOx trap; and the engine is associated with a turbo-compressor.

The invention will be better understood by reading the following description given by way of example only and made in reference to the annexed drawings, in which:

FIGS. 4 and 5 illustrate two variant embodiments of the means for determining the volume flow rate of the gases upstream of the depollution means.

Figure 1:
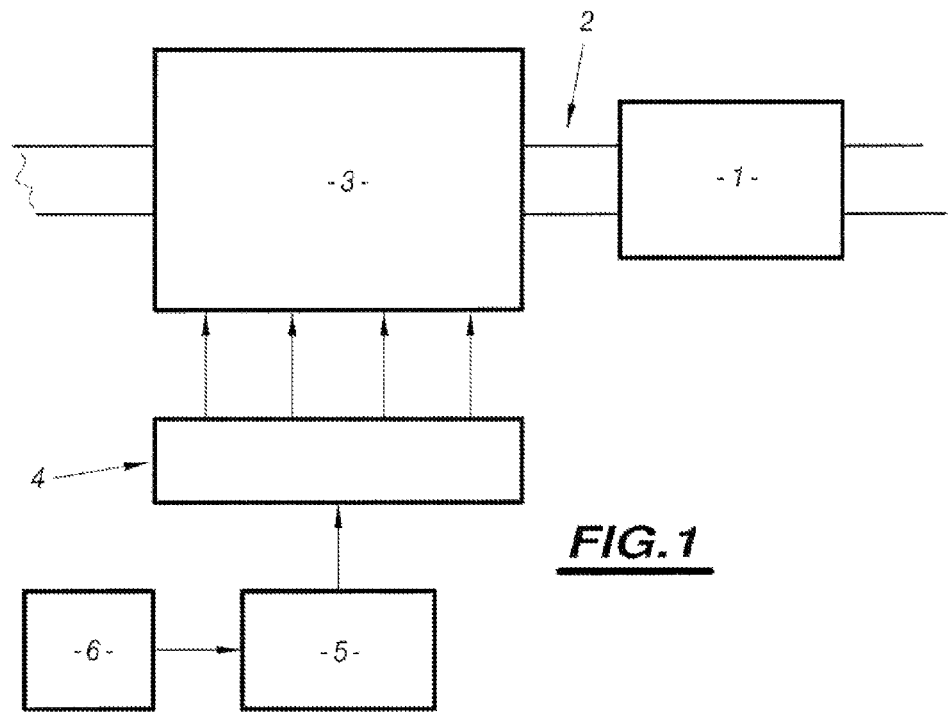
FIG. 1 is a synoptic schematic view illustrating the general structure and the operation of an engine equipped with depollution means.

Indeed, FIG. 1 illustrates depollution means, which are designated by the general reference 1 and which are integrated in an exhaust line 2 of a motor vehicle engine 3.

The engine can be, for example, a motor vehicle diesel engine, the depollution means comprising, for example, a particle filter or others, associated with means forming oxidation catalyst or others, as is already known in the state of the art.

This engine is associated with common rail means for the supply of fuel, designated by the general reference 4 on this Figure, adapted to implement, under the control, for example, of a computer designated by the general reference 5, regeneration strategies of the depollution means by using post-injections of fuel into the cylinders of the engine.

These different strategies are, for example, stored in memorization means designated by the general reference 6 and associated with the computer 5.

This computer also comprises means for evaluating the loading state of the depollution means.

Figure 2:
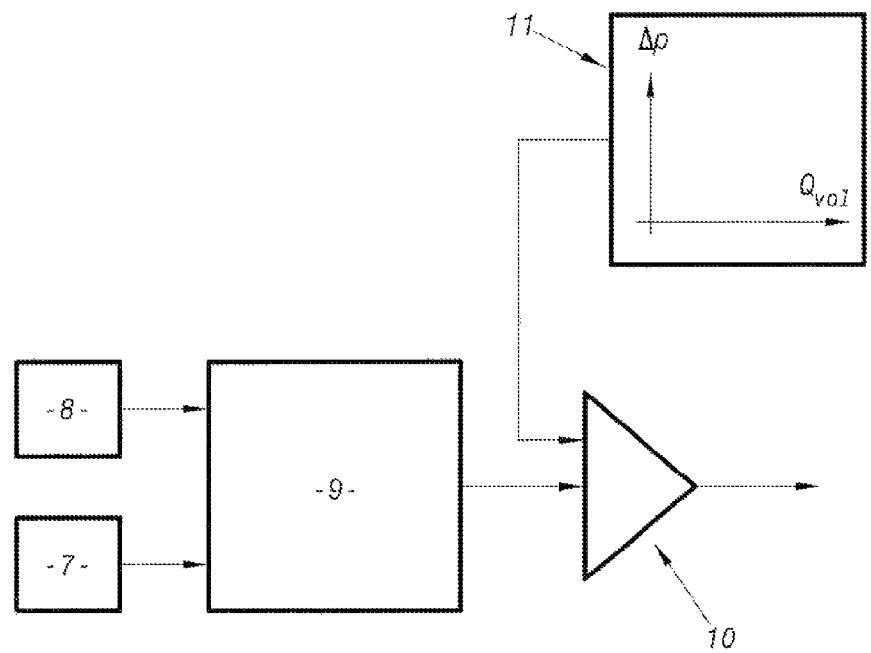
FIG. 2 is a synoptic schematic view illustrating the general structure and the operation of an evaluation system according to the invention.

Indeed, and as illustrated on FIG. 2, this computer integrates means for determining the differential pressure at the boundaries of the depollution means, or of the absolute pressure upstream of the depollution means, designated by the general reference 7 on this FIG. 2, and means for determining the volume flow rate of the gases upstream of these depollution means, these means being designated by the general reference 8.

In addition, the computer comprises means for defining a state point of the depollution means based on this volume flow rate and of this differential pressure, designated by the general reference 9 and means 10 for comparing this state point thus defined of the depollution means to a predetermined abacus of absent, over-loaded, or plugged states of these depollution means, this abacus being, for example, stored in the memorization means designated by the general reference 11.

By comparing the defined state point to this predetermined abacus of states, it is then possible for the computer 5, for example, to provide information of absent, over-loaded, or plugged depollution means.

Figure 3:
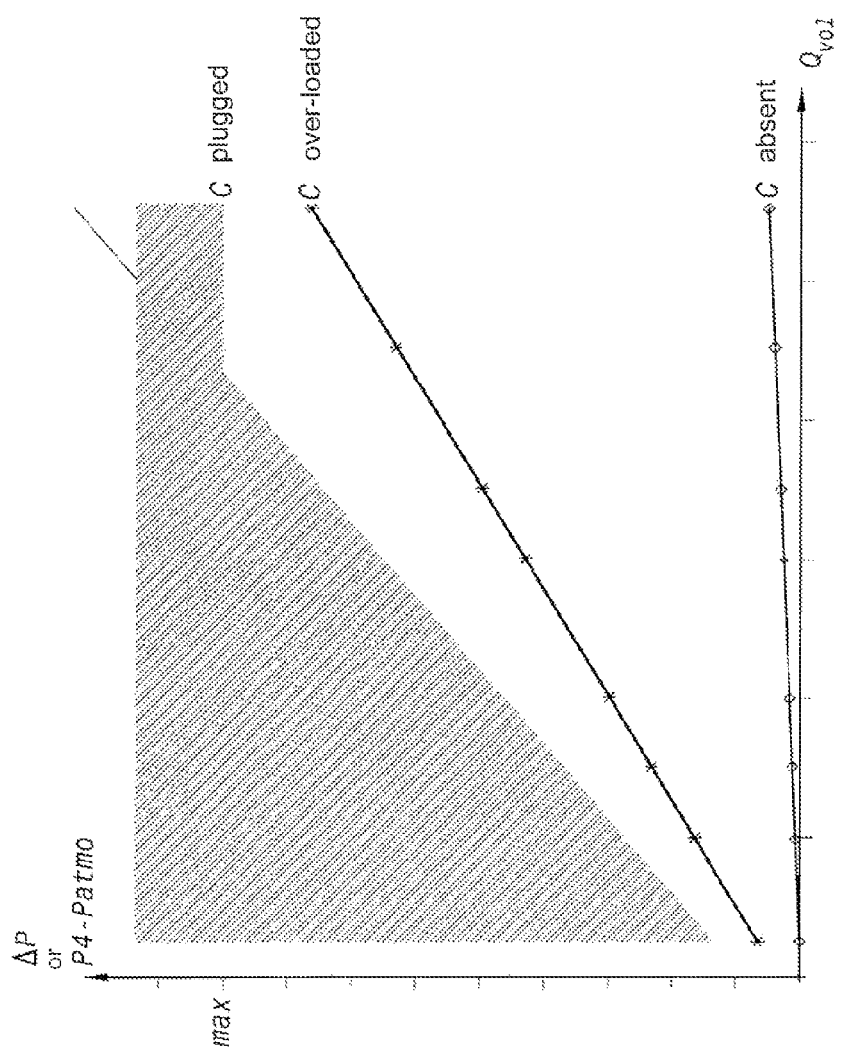
FIG. 3 is a view of a predetermined abacus of states of the depollution means.

Indeed, this is illustrated on FIG. 3, which shows an embodiment of such an abacus where, as a function of the position of the state point on this abacus, it is possible to determine the state of these depollution means by monitoring the counter-pressure at the exhaust.

Thus, for example, a sensor of the differential pressure at the boundaries of the depollution means can be used.

In this case, and as illustrated on FIG. 4, the means for determining the volumic mass 8 receive as input the temperature of the gases upstream of the particle filter, from a sensor designated by the general reference 12 on the Figure, the differential pressure from a sensor designated by the general reference 13, the atmospheric pressure measured from a sensor designated by the general reference 14, and an information on the mass flow rate of gases flowing through these depollution means, from corresponding determination means designated by the general reference 15.

In this case, the volume flow rate is calculated according to the following equation:

$$Q_{vol}=(R*(AT2+273.15)/(\Delta P+Patmo)*\text{Air mass flow rate})$$

in which $Q_{vol}$ represents the volume flow rate, R is a constant, AT2 is the temperature of the gases upstream of the depollution means, $\Delta P$ is the differential pressure at the boundaries of the depollution means, provided by a differential pressure sensor, Patmo is the atmospheric pressure and air mass flow rate is the flow rate of the gases flowing through the depollution means.

However, an absolute pressure sensor upstream of the depollution means can also be envisioned.

In this case, and as shown on FIG. 5, the means for determining the volumic mass 8 then receive as input the temperature of the gases upstream of the particle filter from the sensor 12, the mass flow rate of the air flowing through the depollution means from the determination means 15, and the absolute pressure of the gases at the inlet of the depollution means from a corresponding sensor designated by the general reference 16.

Thus, the determination means 8 can determine the volume flow rate by the following equation:

$$Q_{vol}=(R*(AT2+273.15)/P4*\text{Air mass flow rate})$$

in which $Q_{vol}$ represents the volume flow rate, R is a constant, AT2 is the temperature of the gases upstream of the depollution means, P4 is the absolute pressure of the gases at the inlet of the depollution means, and air mass flow rate is the flow rate of the gases flowing through the depollution means.

The abacus has three curves C absent, C over-loaded, C plugged, respectively, which make it possible to detect the presence or absence of the depollution means, a plugged state of the depollution means, respectively, making it possible to ensure the protection of the engine, and an over-loaded state of the depollution means giving security to the load indicator coming, for example, from other load determination modules of these depollution means in the case of a drift thereof, and thus, ensuring the protection of the depollution means with respect to overly critical regeneration temperatures.

The determination of the loading state can, of course, be subjected to a maintaining condition of this state during a confirmation time period of this predetermined state.

Thus:

If 0<(Qvol, $\Delta$P)<C Absent

For a duration longer than state confirmation time period

Then the state of the PF is absent or State PF=25%

If C Absent<(Qvol, $\Delta$P)<C Over-loaded

For a duration longer than state confirmation time period

Or if RestStatePF=1

Then the state of the PF is normal or State PF=0%

If C Over-loaded<(Qvol, $\Delta$P)<C Plugged

For a duration longer than state confirmation time period

Then the state of the PF is over-loaded or State PF=75%

If (Qvol, $\Delta$P)>C Plugged

For a duration longer than state confirmation time period

Then the state of the FP is plugged or State PF=100%

Of course, the state of the depollution means must be memorized each time the supply to the computer 5 is cut off.

Different additional functions can be envisioned.

Thus, for example, in order to obtain a satisfactory precision and to avoid false detections, the curve C Absent can, for example, be multiplied by an altimetric correction coefficient as a function of the atmospheric pressure.

To avoid false detections, the detection of the different states can also be subjected to a comparison of the determined volume flow rate to a low volume flow rate threshold value, this threshold being, for example, capable of being calibrated.

Thus, the comparison means 10 can also be adapted to compare the determined volume flow rate to this low limit threshold value capable of being calibrated, so as to authorize the determination of the state of the depollution means only if the determined volume flow rate is higher than the low threshold value.

Additional conditions can also be fixed for the detection of the absence of the depollution means.

Thus, for example, if a differential pressure sensor is used, it is appropriate that the learning phase of the offset thereof be terminated, that the flow rate of the post-injections have been zero for a predetermined minimal duration, and that a time counter authorize the detection of such a state.

The different curves of states mentioned above can be calibrated according to an analogous methodology.

Thus, for example, the curve C Absent can be obtained by characterization on the engine bench of a group catalyst+PF in the absence of PF.

The curve is then constructed by noting the different values of ΔP as a function of Q vol.

For the curve C Plugged, a particle filter can, for example, be loaded with soot, until the maximal value of ΔP is reached, i.e., an admissible limit value before the reopening of the exhaust valves of the engine.

The curve C Over-loaded can be, for example, a transposition of the curve C Plugged.

Of course, still other embodiments can be envisioned.

In particular, different embodiments of the depollution means can be provided.

Thus, for example, the depollution means and the means forming oxidation catalyst can be integrated into a single and same element, in particular on a same substrate.

By way of example, a particle filter integrating the oxidation function can be envisioned.

These depollution means can also be impregnated with an SCR formulation ensuring a CO/HC oxidation function in a standard manner.

Similarly, a NOx trap integrating an oxidation function can also be envisioned, whether it is additivized or not.

This oxidation and/or NOx trap function can be fulfilled, for example, by an additive mixed with the fuel.

In this case, the fuel can indeed comprise an additive intended to be deposited, with the soot to which it is mixed, on the depollution means, to facilitate their regeneration.

Similarly, the engine can be associated or not with a turbocompressor.

The invention claimed is:

1. Method for evaluating the loading state of depollution means integrated in an exhaust line of a motor vehicle diesel engine, which comprises:
   determining a pressure in the area of the depollution means,
   determining a volume flow rate of the gases upstream of these depollution means,
   comparing the state point of the depollution means, defined by the pressure and the volume flow rate thus determined, to a predetermined abacus including (i) absent, (ii) over-loaded, and (iii) plugged states of the depollution means, to evaluate the state thereof, and
   detecting (i) the presence or absence of the depollution means, (ii) an overloaded state of the depollution means, and (iii) a plugged state of the depollution means.

2. Method according to claim 1, wherein the pressure is a differential pressure at the boundaries of the depollution means and the volume flow rate upstream of the depollution means is determined according to the following equation:

$$Q_{vol} = (R^*(AT2+273.15)/(\Delta P+P\text{atmo})^* \text{Air mass flow rate})$$

in which $Q_{vol}$ represents the volume flow rate, R is a constant, AT2 is the temperature of the gases upstream of the depollution means, ΔP is the differential pressure at the boundaries of these depollution means, provided by a differential pressure sensor, Patmo is the atmospheric pressure and air mass flow rate is the flow rate of the gases flowing through the depollution means.

3. Method according to claim 1, wherein the pressure is an absolute pressure upstream of the depollution means and the volume flow rate upstream of the depollution means is determined according to the following equation:

$$Q_{vol} = (R^*(AT2+273.15)/P4^* \text{Air mass flow rate})$$

in which $Q_{vol}$ represents the volume flow rate, R is a constant, AT2 represents the temperature of the gases upstream of the depollution means, P4 is the absolute pressure of the gases provided by an absolute pressure sensor at the inlet of the depollution means, and air mass flow rate is the flow rate of the gases flowing through the depollution means.

4. Method according to claim 1, wherein, in the abacus, the states of the depollution means are defined by absent state, over-loaded state, and plugged state curves, among which the absent state curve of the depollution means is multiplied by an altimetric correction coefficient as a function of the atmospheric pressure.

5. Method according to claim 1, wherein the comparison means comprise means for comparing the determined volume flow rate to a low volume flow rate threshold value, to authorize the determination of the state of the depollution means only if the determined volume flow rate is higher than the low threshold value.

6. Method according to claim 1, wherein the abacus includes a first curve C Absent for determining the state of presence or absence of the depollution means, a second curve C Over-loaded for determining the overloaded state of the depollution means, and a third curve C Plugged, said method comprising maintaining exhaust valves of the engine closed as long as the plugged state of the depollution means is detected.

* * * * *